Nov. 16, 1943. E. H. SPIRO, JR., ET AL 2,334,590
BIRD CAGE FEEDER
Filed June 29, 1940
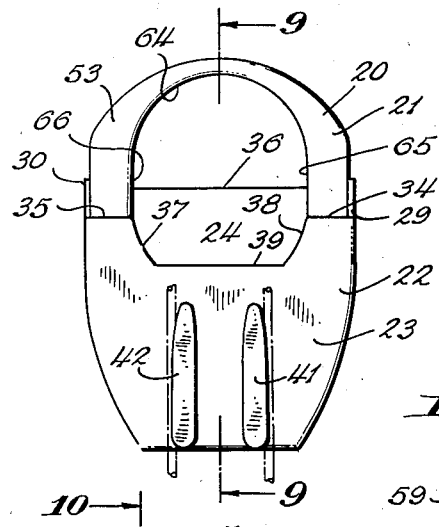
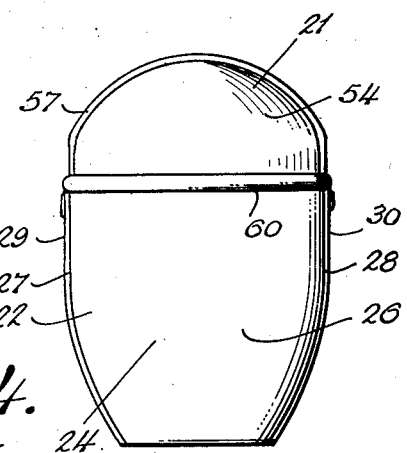
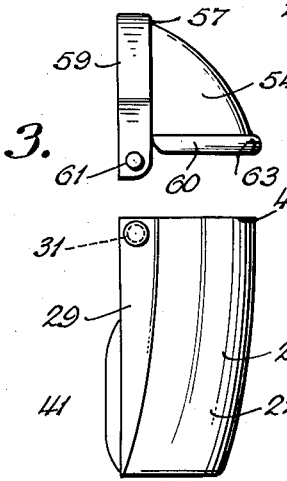
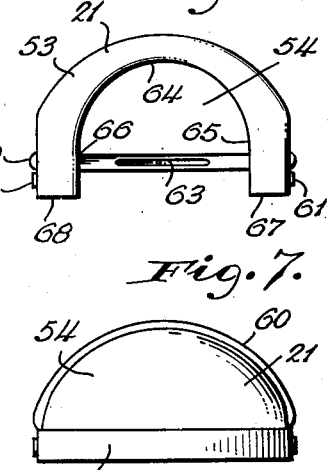
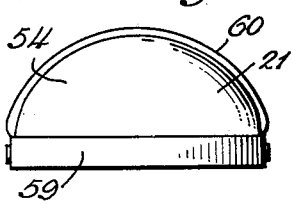
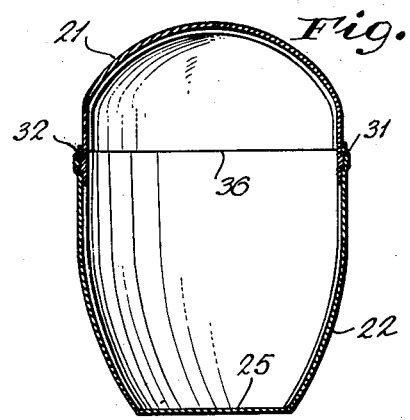
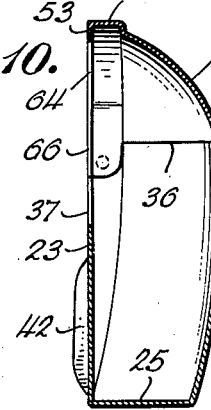
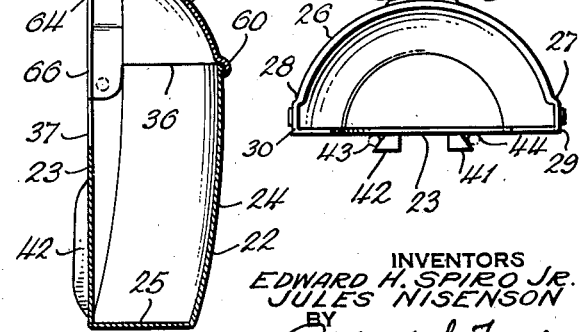
INVENTORS
EDWARD H. SPIRO JR.
JULES NISENSON
BY Richard S. Jenks
ATTORNEY Patented Nov. 16, 1943

2,334,590

UNITED STATES PATENT OFFICE 2,334,590

BIRD CAGE FEEDER

Edward H. Spiro, Jr., and Jules Nisenson, New York, N. Y.; said Niesenson assignor to said Spiro Application June 29, 1940, Serial No. 343,214

4 Claims. (Cl. 119—18)

This invention relates generally to bird cage accessories and more particularly to feeding devices for use with bird cages.

In the keeping of birds as pets in cages, it is desirable to provide means for maintaining the health of the bird including so called bird-baths and abrasive means upon which the bird may trim its beak and claws. Contrasted with these accessories, however, are devices which constitute the subject matter of the present invention, which are especially suited for containing and making available for use by the bird of food, principally in the form of seed, and water.

While the principal dimensions of the present feeding devices are largely determined by the size of the bird and the quantity of food it is desired to place for use by the bird, the constructions which are the subject matter of the present invention may be altered in size to accommodate various sized birds in various sized cages.

Heretofore bird cage feeders have been principally of one-piece glass or ceramic construction having relatively thick walls and being extremely fragile. By reason of the one-piece construction thereof, said feeding devices have been extremely difficult to properly clean, and since the feeder may very easily contaminate the food which is stored within the same, this has constituted a serious objection thereto.

Among the objects of the present invention is the provision of a novel bird cage feeder which is of two-piece construction, and is molded of plastic material, as for example cellulose acetate, urea compounds, phenolic compounds, and the like.

Another object herein lies in the provision of a bird cage feeder which has relatively thin walls and novel arrangement of the parts, so that the same has a larger capacity for a given bulk. In accordance with the present invention, the size, shape and integration of certain of the parts in novel organization permits a strong and useful article to be produced with a large saving in material and labor.

A feature of the present invention lies in the fact that the complete bird cage feeder is light in weight and is of durable construction so that the same is not easily broken during the cleaning or filling thereof.

Another object herein lies in the provision of a bird cage feeder which may be readily opened for inspection or cleaning without dismantling the parts, or where it is desired, the complete feeder may be dismantled without the use of any special skill or tools.

In accordance with the present invention, the cover member of the bird cage feeder serves as a protection against contamination of the contents of the cup portion thereof, and by reason of the novel integration of the parts, the cup or base member and the cover may be of contrasting colors. By reason of the construction and manner of fabrication of the present bird cage feeders the same may be given a desirable streamlined appearance and be manufactured at large scale at an extremely low cost with a consequent wide sale and distribution.

These objects and other incidental ends and advantages will more fully appear in the progress of this disclosure and be pointed out in the appended claims, in which:

Figure 1 is a rear elevational view of an embodiment of the invention in the closed position thereof.

Figure 2 is a front elevational view of the embodiment shown in Figure 1 or as seen from the rear of said figure.

Figure 3 is a side elevational view as seen from the right side of Figure 1 or the left side of Figure 2.

Figure 4 is a side elevational view taken similarly to Figure 3 of the cover member as detached from the cup or base member.

Figure 5 is a side elevational view taken similarly to Figure 3 of the cup or base member as detached from the cover member.

Figure 6 is a rear elevational view of the cover member as viewed from the left side of Figure 4.

Figure 7 is a top plan view of Figure 6.

Figure 8 is a top plan view of the cup or base member, as the same might be seen from the top of Figure 5, rotated through 90° in a horizontal plane.

Figure 9 is a central vertical sectional view as seen from the plane 9—9 on Figure 1.

Figure 10 is a vertical sectional view as seen from the plane 10—10 on Figure 3.

Turning now to the embodiment of the invention illustrated in Figures 1 to 10 inclusive, the bird cage feeder indicated generally by numeral 20 comprises a cover member 21 and a cup or base member 22.

The base member 22 is generally in the form of a hollow vessel including a substantially planar rear wall 23, a rounded front wall 24, and a substantially planar bottom wall 25. The general configuration of the rounded front wall 24 is irregular and is best seen in the Figures 8 and 9.

The front wall includes the main rounded portion 26, the narrow off-set portions 27 and 28, and the wide flange portions 29 and 30. The uppermost parts of the off-set portions 27 and 28 are preferably substantially parallel to the rear wall 23, the lower parts curving toward wall 23; while the flange portions 29 and 30 are preferably perpendicular to said wall. The flange portions 29 and 30 decrease in width as they approach the bottom wall 25. The upper portions of the flange portions 29 and 30 are provided with circular depressions 31 and 32 which open toward the inside of the base member 22. These depressions are preferably relatively shallow and depending upon the thickness of the walls of the cup 22, may produce correspondingly disk shaped projections on the outer surfaces of the flange portions 29 and 30. If desired, the depressions 31 and 32 may have orifices substituted therefor.

The upper edges 34 and 35 of the rear wall 23 are disposed below the level of the upper edge 36 of the front wall 24. The upper edge of the rear wall also includes the outwardly curved edge portions 37 and 38, and the substantially rectilinear edge 39. The forward portion of the upper edge 36 is provided with an outwardly extending ridge or bead 40. The lower portion of the rear wall 23 includes the integral lugs 41 and 42 used for engaging the vertical wires of a bird cage, said cage not being shown in the drawing. The lugs 41 and 42 have the upper and lower ends thereof rounded and the outer lateral vertical surfaces thereof are angularly disposed, as best seen in Figure 8, in which the vertical bird cage wires 43 and 44 are indicated by dot-dash lines.

The cover member 21 is in the general shape of a hollow vessel including a rear wall 53 and a front wall 54, which is of irregular configuration, best seen in Figures 2, 7, and 9. The rear portion of the front wall is provided with a narrow off-set portion 57 and a wide flange portion 59. The lower ends of the flange portion 59 are so disposed that the outer surfaces thereof are spaced apart a distance approximately equal to or slightly greater than the space between the inner surfaces of the upper portions of the flanges 29 and 30. The said lower portions of the flange 59 are provided with outwardly extending disk-like bosses 61 and 62. The depth and diameter of said bosses is such that they may enter the depressions 31 and 32 with only slight clearance. The lower front edge of the front wall 54 is provided with an outwardly extending bead 60, which is provided with a shallow rabbet or undercut 63 (indicated in dotted lines on Figure 4 and also seen in Figures 6 and 9) which is adapted to detachably engage the ridge or bead 40 on the front wall 24. The rear wall 53 includes the rounded edge 64, the substantially rectilinear edge portions 65 and 66, and the horizontal lower edge portions 67 and 68. The edge portions 67 and 68 are disposed below the level of the edge 36 at such a position that when the bosses 61 and 62 are engaged within the depressions 31 and 32, the edges 68 and 67 will be adjacent the edges 35 and 34 with sufficient clearance existing therebetween so that the cover member 21 may be swung back to a position indicated by the dot and dash lines on Figure 3.

Both the cover member 21 and the base member 22 may be molded from plastic or similar material, each in a single operation. Since the bosses 61 and 62 and the depressions 31 and 32 are of relatively short dimensions (transversely of the device 20) and the rabbet or undercut 63 and the bead 40 are also of short dimensions (transversely of the device), it is not necessary to utilize multiple dies, but the composition of the plastic is desirably such that the parts are slightly resilient, sufficient to permit them to be snapped off the dies after the parts have hardened.

By reason of the fact that the walls of the base member 22 are relatively thin, and the edge 39 is substantially rectilinear, the capacity of the base member is increased over prior art forms having the same bulk.

Assuming the parts to have been completely molded and that they appear as shown in Figures 4 and 5, it is only necessary to slightly compress the lower ends of the flange 59 toward each other so that the bosses 61 and 62 may be snapped within the depressions 31 and 32. It may be noted at this point that the rear wall 53 serves to stiffen and reenforce the cover member so that adequate resiliency is maintained and the cover member is mounted rotatably with relation to the base member. With the cover member 21 tilted back as indicated by the dot dash lines in Figure 3, it is a simple matter to place bird food, solid or liquid, into the cup 22. It is also a simple matter to clean out previously placed food which has become contaminated or spoiled. After the base member 22 is filled to a point slightly below the edge 39, the cover member 21 is rotated about its bosses until the undercut 63 engages the ridge or bead 40, thereby snapping the device into a closed position. The feeder 20 may then be placed in cooperation with a cage by engaging the lugs 41 and 42 between the cage wires 43 and 44, in a well known manner.

Since the device is relatively light in weight and non-porous, it is a simple matter to remove the same and sterilize it when necessary. Where desired, by reason of the fact that the cover member is detachably engageable with the cup 22, it is possible to use the cup without the cover. In using the device, the bird pokes its head through the generally circular opening formed by the edges 66, 64, 65, 38, 39 and 37, as best seen in Figure 1. By removing the cover member, birds having heads too large to enter the said opening, may use the feeder.

It may thus be seen that we have provided a novel bird cage feeder which has the desirable qualities of lightness in weight, cleanliness, convenience in filling and cleaning, adaptability for different purposes, good appearance, and low cost.

We wish it to be understood that we do not desire to be limited to the exact details of construction shown and described for obvious modifications will occur to a person skilled in the art.

We claim:

1. A bird feeder for use with a bird cage, said feeder comprising: a base member in the form of a hollow vessel, said base member having oppositely disposed first and second flange portions; a cover member composed of resilient material in the form of a hollow vessel having a curved front wall and a substantially planar rear wall, said front wall having a third flange in the rear portion thereof and adjoining said rear wall; and complementary boss and recess means on the first and second flanges and the ends of the third flange detachably and pivotally interconnecting the base member and the cover member; said rear wall co-acting with said third flange to limit the distortion thereof.

2. A bird feeder for use with a bird cage, said feeder comprising: a base member in the form of a hollow vessel, said base member having oppositely disposed first and second flange portions; a cover member composed of resilient material in the form of a hollow vessel having a rounded front wall and a substantially planar rear wall, said front wall having a third flange in the rear portion thereof adjoining said rear wall; said rear wall being disposed substantially perpendicular to said flange; and complementary boss and recess means on the first and second flanges and the ends of the third flange detachably and pivotally interconnecting the base member and the cover member; said rear wall co-acting with said third flange to control the resiliency thereof.

3. A bird feeder for use with a bird cage, said feeder comprising: a base member in the form of a hollow vessel, said base member having oppositely disposed first and second flange portions; a cover member having a rounded front wall and a relatively flat rear wall; said front wall having a third flange in the rear portion thereof and adjoining the said rear wall; said third flange extending below the rear edge of said front wall to form a pair of third flange ends; and complementary boss and recess means on the first and second flanges and on the said pair of ends of the third flange.

4. A bird feeder for use with a bird cage, said feeder comprising: a base member in the form of a hollow vessel composed of resilient material, said base member having oppositely disposed first and second flange portions and having an outwardly extending ridge on the forward portion thereof; a cover member composed of resilient material in the form of a hollow vessel having a curved front wall having a rabbet therein and said front wall having a third flange in the rear portion thereof and adjoining said rear wall, and complementary bosses and recess means on the first and second flanges and the ends of the third flange detachably and pivotally interconnecting the base member and the cover member; said rear wall co-acting with said third flange to limit the distortion thereof; and said rabbet and ridge co-acting to detachably secure said cover member in closed position with relation to said base member.

EDWARD H. SPIRO, Jr.
JULES NISENSON.